(No Model.)
A. WAHLIN, C. J. LUNDSTRÖM & T. COLLINS.
EXTRACTOR CHURN.
No. 446,651. Patented Feb. 17, 1891.
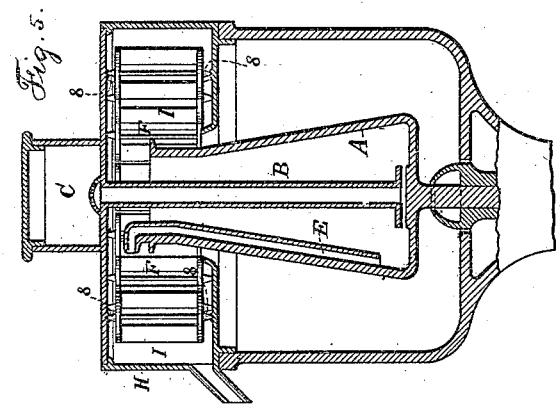
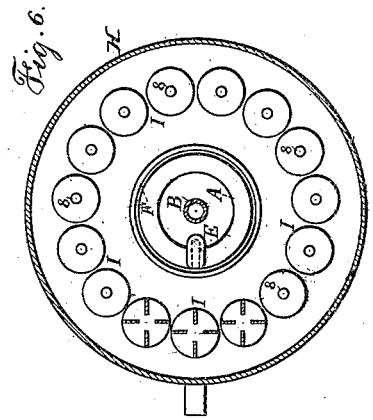
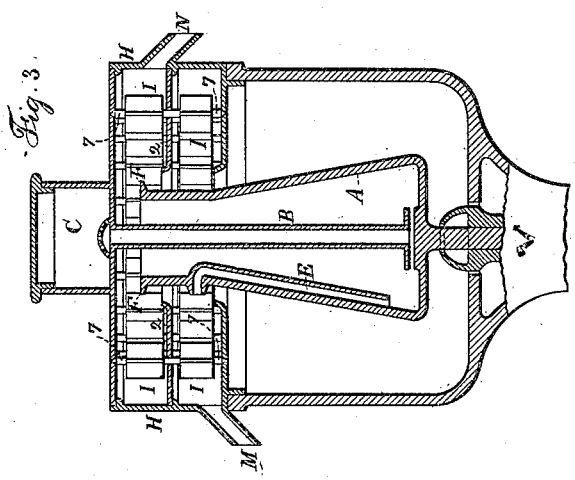
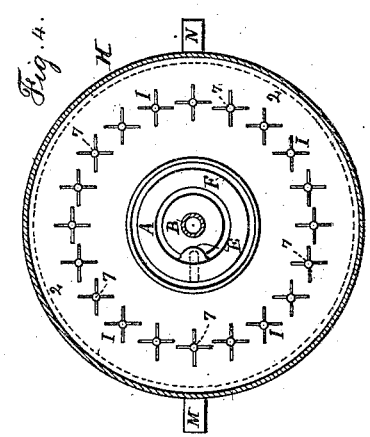
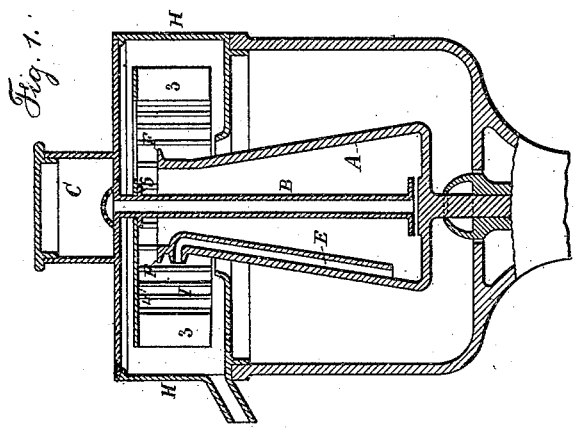
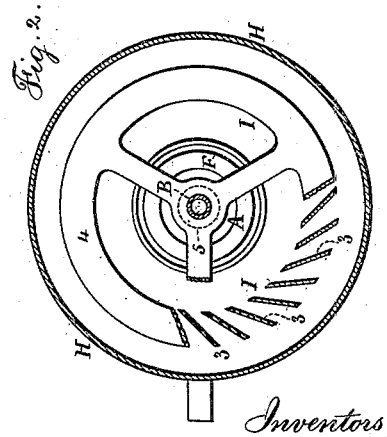
Witnesses:
J. Staib
Chas H. Smith
Inventors:
Adolph Wahlin
Carl Johan Lundström
Thomas Collins
per Lemuel W. Serrell atty

UNITED STATES PATENT OFFICE.

ADOLPH WAHLIN AND CARL J. LUNDSTRÖM, OF STOCKHOLM, SWEDEN, AND THOMAS COLLINS, OF WINCHESTER, NEW HAMPSHIRE, ASSIGNORS TO R. DUNCAN HARRIS, OF NEW YORK, N. Y.

EXTRACTOR-CHURN.

SPECIFICATION forming part of Letters Patent No. 446,651, dated February 17, 1891.

Application filed January 20, 1890. Serial No. 337,422. (No model.)

*To all whom it may concern:*

Be it known that we, ADOLPH WAHLIN and CARL JOHAN LUNDSTRÖM, subjects of the King of Sweden, and residing in Stockholm, Sweden, and THOMAS COLLINS, a subject of the Queen of Great Britain, residing in Winchester, in the State of New Hampshire, have invented an Improvement in Extractor-Churns, of which the following is a specification.

Centrifugal separators for cream have been made use of in which the skim-milk is discharged at a different place from the cream, and according to the extent of the centrifugal action so the cream will be more or less concentrated. In some cases the cream has been subjected to an agitating operation resulting from contact with the cream of rotary or stationary agitators or trundles.

Our invention as distinguished from pre-existing devices relates to the combination, with a revolving separator, of a butter-accumulator composed of plates or wings, upon which the buttery particles are caused to adhere by the violence of the centrifugal movement and upon which they remain sufficiently for the more watery skim-milk to pass away, and the butter particles, striking against each other upon the accumulator, adhere together and produce globules and small masses of butter that are easily separated from the skim-milk.

In the drawings, Figure 1 is a vertical section of the apparatus in one form employed by us. Fig. 2 is a sectional plan view of the same, and Figs. 3, 4, 5, and 6 are similar views in slightly modified form.

The centrifugal vessel A is upon a revolving shaft, and its axis may be either vertical or horizontal. The vessel A is preferably conical, and the milk is supplied by the pipe B from any suitable vessel C, and the centrifugal action produces a separation of the skim-milk and the cream, the former passing off by the pipe E and the cream being thrown off from the edge F of the separator.

The revolving separator may be inclosed in any suitable case, and there is a receiving-vessel for the cream and skim-milk.

In Fig. 1 a single receiving-vessel H is shown, and in Fig. 3 this vessel is represented as divided by a partition 2, so that the cream passes into the upper vessel and the skim-milk into the lower vessel.

The butter-accumulator I is made with numerous surfaces, against which the buttery particles are projected with the violence due to the centrifugal action, and such buttery particles adhere thereto and to each other sufficiently to form granules or particles that accumulate, and the skim-milk continues to move and passes away and the granules or buttery particles increase in size and are detached from time to time by the impacts of the skim-milk against them and they pass off with such skim-milk.

In Figs. 1 and 2 the accumulator is shown as a series of diagonal blades or wings 3 3, pendent from a ring 4, that receives its support from cross-bars, and a collar 5 around the milk-supply pipe, and in Figs. 3 and 4 the accumulator-surfaces are shown as wings upon separate arbors or shafts 7, supported within the receiving-vessel H, while in Figs. 5 and 6 the accumulator-surfaces are shown as plates between disks on separate pivots 8, supported within the receiving-vessel H. In both cases the accumulators are free to revolve by the impact of the butter particles against the surfaces, and this revolving action promotes the efficiency of the apparatus.

We have represented the wings or accumulators, Figs. 1 and 2, as diagonal to the radii in order that the butter particles striking the surfaces of the wings may spread outwardly and adhere sufficiently for the succeeding particles to accumulate by adhering to the first, and the skim-milk will run off the accumulator the more rapidly in consequence of being watery. We prefer, also, to have the butter particles strike the surfaces of the accumulators higher up than the skim-milk, and in Fig. 3 there is represented a partition 2 for separating the butter particles and cream from the skim-milk, and a spout M for the skim-milk and a spout N for the butter particles to pass off. In all cases the skim-milk, being the heaviest, is thrown off first, and striking against the accumulators will set them in motion, so that the impact of the cream particles against the surfaces of the accumulators will not be too violent. If the pipe E for the skim-milk extends up higher than the edge from which the cream is thrown off, as shown in Fig. 5, the skim-milk will run down upon the accumulator-surfaces and moisten the same sufficiently to prevent the butter particles adhering too firmly.

Upon reference to Figs. 1 and 2 it will be seen that the accumulators present diagonal surfaces to the skim-milk and cream, and the ring from which they are suspended is supported by the stationary pipe B. Hence the ring and the accumulators may either revolve or remain stationary and the accumulators act in nearly the same manner when stationary that they do when revolving.

It is to be borne in mind that the cream is composed of buttery particles and skim-milk or buttermilk, and the particles of cream separate as they strike forcibly against the accumulators, because there is a slight adhesion between the surfaces of the accumulators and the buttery particles, and there is little or no adhesion of the skim-milk that there is in the cream with such surfaces. Hence there will always be sufficient moisture on the surfaces of the accumulators to prevent the buttery particles adhering too firmly, and when the centrifugal action of the materials is availed of to rotate the accumulators the speed of rotation will be augmented by the joint action of the cream and skim-milk; but this does not materially change the action of the accumulators in gathering the buttery particles.

We claim as our invention—

1. The combination, with a centrifugal separating-vessel having skim-milk and cream deliveries and a surrounding stationary vessel, of butter-accumulators within such vessel and adjacent to the cream-delivery, and upon the surface of which accumulators the butter particles strike as they are thrown off centrifugally and adhere sufficiently for the skim-milk to separate, substantially as set forth.

2. The combination, with a centrifugal separating-vessel having cream and skim-milk deliveries, of a butter-accumulator adjacent to the cream-delivery and composed of a range of plates against which the butter particles are thrown from the separator, and a support for such accumulator, around which the accumulator revolves by the impact of the butter particles and skim-milk, substantially as set forth.

Signed by us this 8th day of January, 1890.

ADOLPH WAHLIN.
C. J. LUNDSTRÖM.
THOS. COLLINS.

Witnesses:
GEO. T. PINCKNEY,
WILLIAM G. MOTT.